United States Patent
Bondioli (10) Patent No.: US 6,203,440 B1
(45) Date of Patent: Mar. 20, 2001

(54) PROTECTIVE SECOND BOOT FOR CONNECTABLE COMPONENTS, FOR PREVENTING ACCIDENTS INVOLVING DRIVELINES INCORPORATING SHAFTS WITH UNIVERSAL JOINTS OR THE LIKE

(76) Inventor: Edi Bondioli, -Via Gina Bianchi 18, 46028 Suzzara, Mantova (IT)

( * ) Notice: Subject to any disclaimer, the term of this patent is extended or adjusted under 35 U.S.C. 154(b) by 0 days.

(21) Appl. No.: 09/242,379

(22) PCT Filed: Jul. 28, 1997

(86) PCT No.: PCT/IT97/00189

§ 371 Date: Feb. 12, 1999

§ 102(e) Date: Feb. 12, 1999

(87) PCT Pub. No.: WO98/06955

PCT Pub. Date: Feb. 19, 1998

(30) Foreign Application Priority Data

Aug. 14, 1996 (FI) ........................................................ 000198

(51) Int. Cl.[7] .................................................. F16C 1/26
(52) U.S. Cl. ........................... 464/173; 277/636; 403/23; 464/175
(58) Field of Search ..................................... 464/177, 173, 464/901, 175, 170, 171; 74/609, 607; 277/636, 635, 928; 403/23

(56) References Cited

U.S. PATENT DOCUMENTS

| 2,025,635 | * | 12/1935 | Bishoff ............................... 464/173 |
| 3,797,329 | * | 3/1974 | Quirk ..................................... 74/609 |
| 3,866,440 | * | 2/1975 | Stananought ............................. 64/18 |
| 4,308,931 | * | 1/1982 | Khanna .................................. 74/609 |
| 4,324,533 | * | 4/1982 | Schroeder et al. ..................... 403/23 |
| 5,364,310 | * | 11/1994 | Taylor .................................. 464/170 |
| 5,895,323 | * | 4/1999 | Benzi .................................. 464/173 |

* cited by examiner

*Primary Examiner*—Terry Lee Melius
*Assistant Examiner*—Kenneth Thompson
(74) *Attorney, Agent, or Firm*—McGlew and Tuttle, P.C.

(57) ABSTRACT

The second boot that protects parts adjacent to a fixed box from which there projects a rotating hub that is to be connected to a driveline (with the possible presence of a friction clutch or of a torque limiting means) comprises— attached to the fixed box (1)—a disc (11) with a peripheral edge (11A) for engagement and fastening; and a sleeve (17) that can be engaged inside the edge (11A–11B) of said disc (11), with fastening clips (22) capable of being clipped to and unclipped from said edge (11A–11B). Said sleeve (17) may include protective layers around the parts which it encloses.

10 Claims, 8 Drawing Sheets

PROTECTIVE SECOND BOOT FOR CONNECTABLE COMPONENTS, FOR PREVENTING ACCIDENTS INVOLVING DRIVELINES INCORPORATING SHAFTS WITH UNIVERSAL JOINTS OR THE LIKE

FIELD OF THE INVENTION

The invention relates to an improved second boot for protecting parts adjacent to a fixed box from which there projects a rotating hub that is to be connected to a driveline incorporating a shaft with universal or other joints and with its own protection, with the possible presence of a friction clutch or of a torque limiting means or other member. Among the objects of the invention, which will be understood on reading the following text, are ease of access for operation on the parts inside, ease of dismantling and so forth.

SUMMARY AND OBJECTS OF THE INVENTION

The second boot according to the invention basically comprises: attached to the fixed box, a disc with a peripheral edge for engagement and fastening; and a sleeve that can be engaged inside the edge of said disc with fastening clips capable of being clipped to and unclipped from said edge. Said sleeve may include protective layers around the parts which it encloses.

In practice, said sleeve may comprise a tubular skirt having flexible portions and made from a relatively flexible synthetic material.

Advantageously provided in the disc are ventilation apertures, with deformations that function in conjunction with the passage defined between the sleeve and the protective boot surrounding the universal joint of the driveline; the deformations also tend to limit any deforming of said skirt.

On the inside of said tubular skirt there may a tubular layer with insulating properties, and a tubular sheet metal price for reinforcement from the inside of said tubular layer. The tubular layer and said tubular sheet metal piece may both be bent strips held in place by locking rings housed in channels formed in the sheet metal piece.

The second boot to which the invention relates may advantageously comprise a connecting chain between said disc and said sleeve and a chain, with a clip, between said disc and the protective sheath of the jointed drive shaft.

A cleaner understanding of the invention will be gained from the description and accompanying drawing, which latter shows a practical, non-restrictive example of the invention.

DESCRIPTION OF THE PREFERRED EMBODIMENTS

As depicted in FIGS. 1 to 5, the numeral 1 is a general reference for a power take-off box or housing, extending from a portion 1A of which is a power take-off 3 consisting of a short projecting splined shaft, similar to shaft 3A which also projects from the box 1. Engaged on the power take-off 3 in the drawing is the fork 5A of a universal joint 5, whose second fork 5B is combined with a telescopic shaft 7 of a driveline that includes two universal joints, of a type that is known, especially in agricultural machinery, and as such fitted with a protective covering formed by a telescopic sheath 9A and by a shaft boot 9B to protect the universal joint 5. The invention relates to a second or housing boot which is fitted conventionally to portion 1A of the box 1 to surround the joint 5 and also to overlap around the first boot 9B of the aforesaid protective covering 9A, 9B.

As shown in the drawings, a disc 11 with a basically cylindrical edge 11A terminating in an outward turned-back lip 11B is attached to the end face of the portion 1A of the box 1 (the portion from which the power take-off 3 projects). The disc 11 has a series of windows in its flat central area partly for the exit of the power take-off shaft 3, and partly for its attachment by means of bolts to the end surface of the portion 1A, adapting it to the different dimensions of commercially available boxes; furthermore, and characteristically, said disc 11 has ventilation apertures 13 which are made by slitting the sheet metal of the disc 11 and bending the material of said disc into deformations 13A. These deformations 13A project from the surface around and immediately inside the edge 11A of the disc. The disc 11 is attached to the end surface of the portion 1A with bolts 15 so that it can easily be attached and made substantially secure while yet being easily removable.

A sleeve 17 can be fastened to the disc 11 and constitutes the main structure of the second boot. This sleeve 17 comprises a skirt 19 which is at least partly flexible with corrugations 19 and which forms a shaped edge 20 to allow it to be inserted inside the edge 11A and rest against the lip 11B of the disc 11. The sleeve 17 is fitted with clips 22 for clipping it to said terminal peripheral lip 11B of the edge 11A of the disc 11, in such a way that it can be released at any time by a quick and very simple operation. A light chain 24 can be attached to the disc 11 and to the sleeve 17 so that the sleeve cannot be lost, but also allows said sleeve 17 to be partially removed with ease from the disc 1 fixed to the box 1. 26 denotes another chain (see FIG. 2 in particular) that can in a quickly detachable way connect the protective covering 9A, 9B of the universal-jointed shaft 7, 5 to the second boot which is represented by the disc 11 and sleeve 17, and actually to connect said protective covering to the disc 11, in order to prevent spontaneous rotation of said protective covering 9A, 9B.

The second boot formed by the disc 11 and sleeve 17 is adapted for axial length by removing some of the corrugated part 19, in order to adapt the second boot to the dimensions of the shaft to which it is to be fitted.

Figure 1:
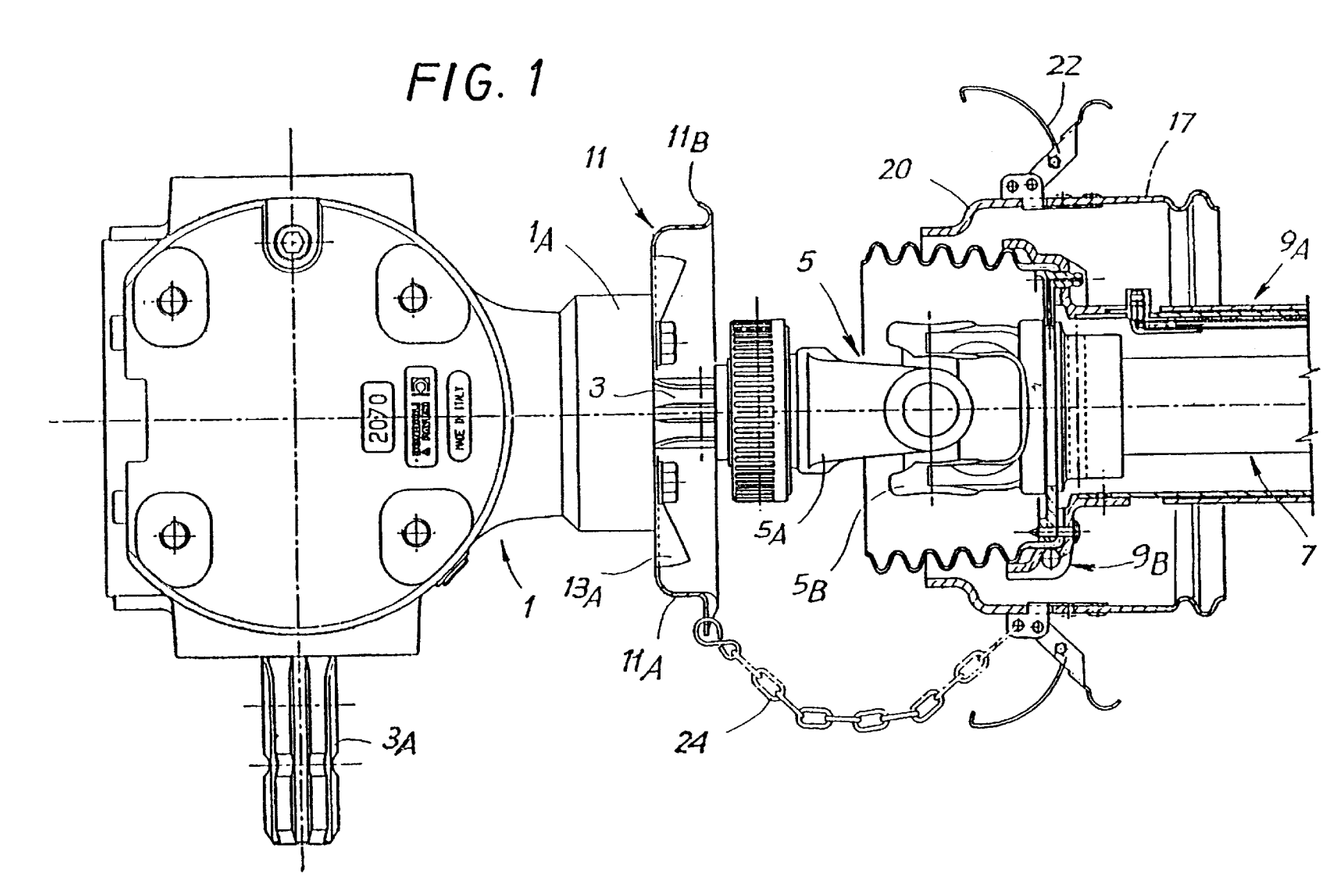
FIGS. 1 and 2 show the assembly in a side view and partial section with certain components separated in FIG. 1 and assembled in FIG. 2.
Figure 2:
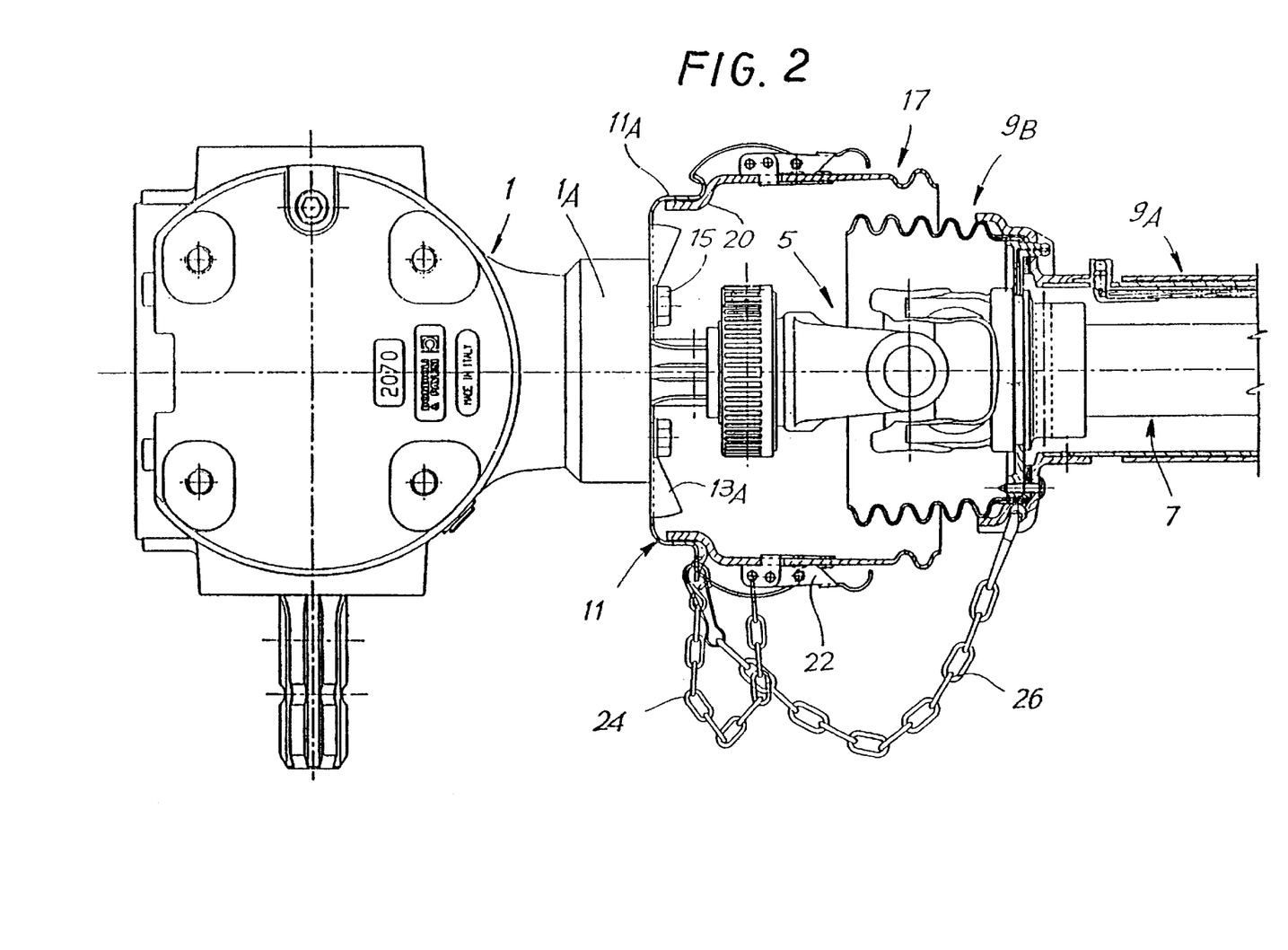
Figure 3:
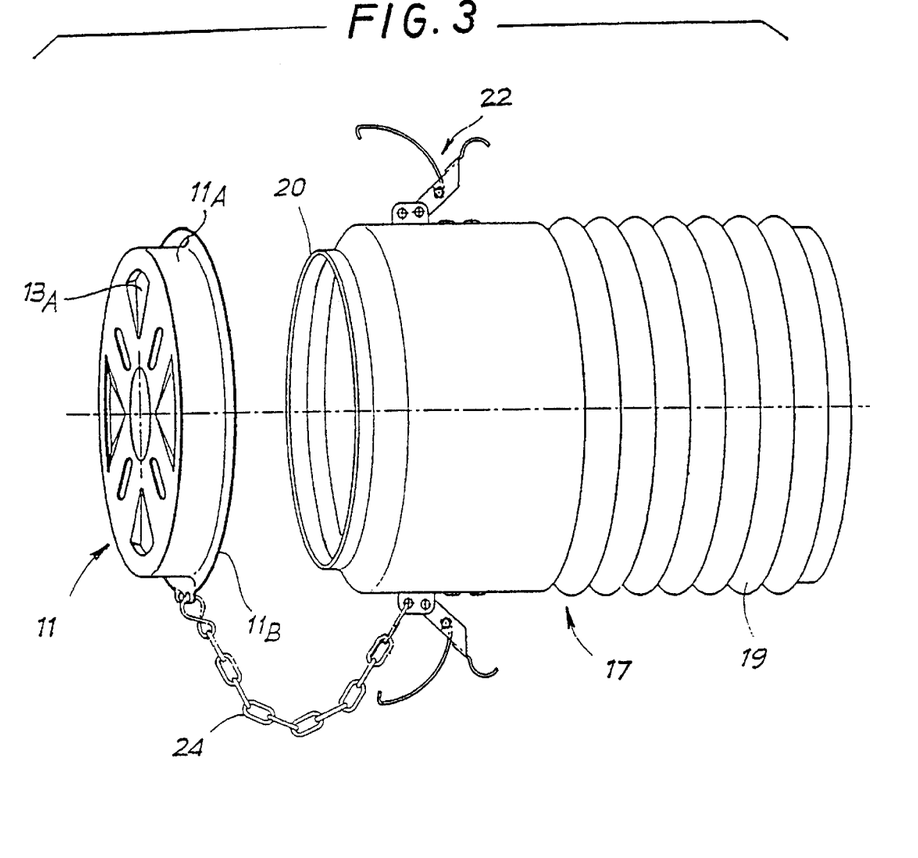
FIGS. 3, 4 and 5 show certain components in isolation, FIG. 5 being a section of V—V as marked in FIG. 4.
Figures 4, 5:
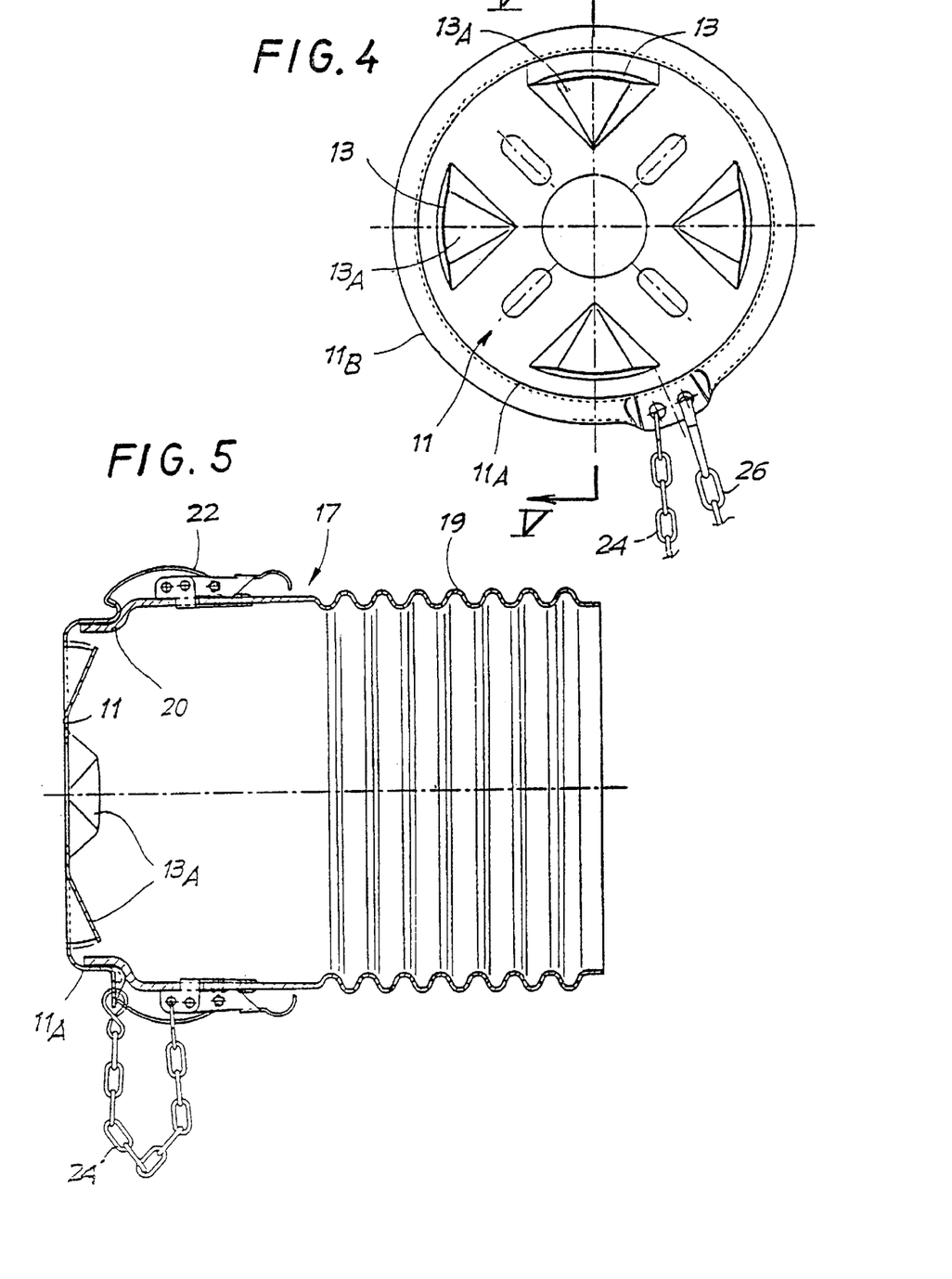
Figure 6:
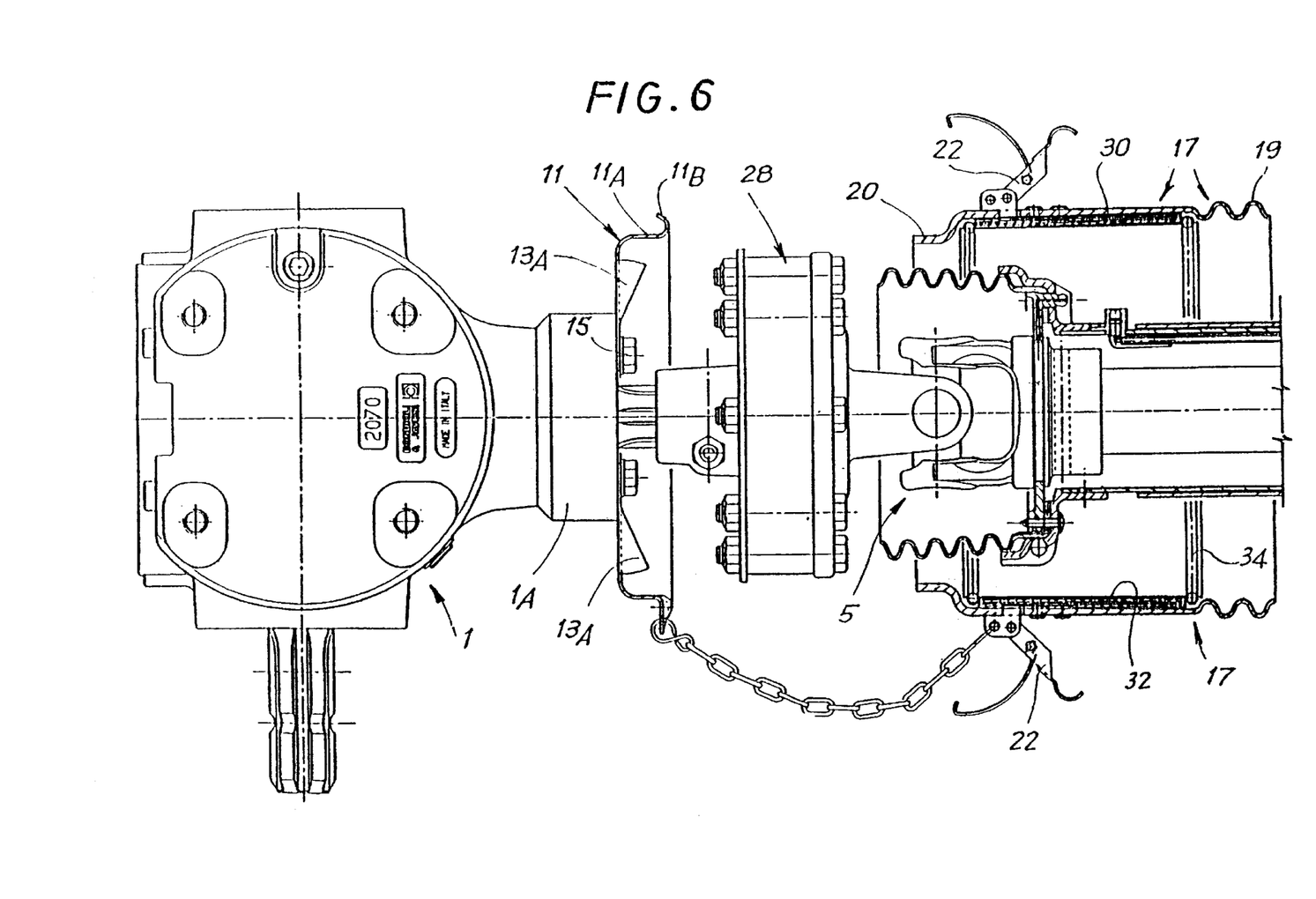
FIGS. 6 and 7 correspond to FIGS. 1 and 2 and show an embodiment that has been modified to also include a friction clutch or equivalent torque limiting means.
Figure 7:
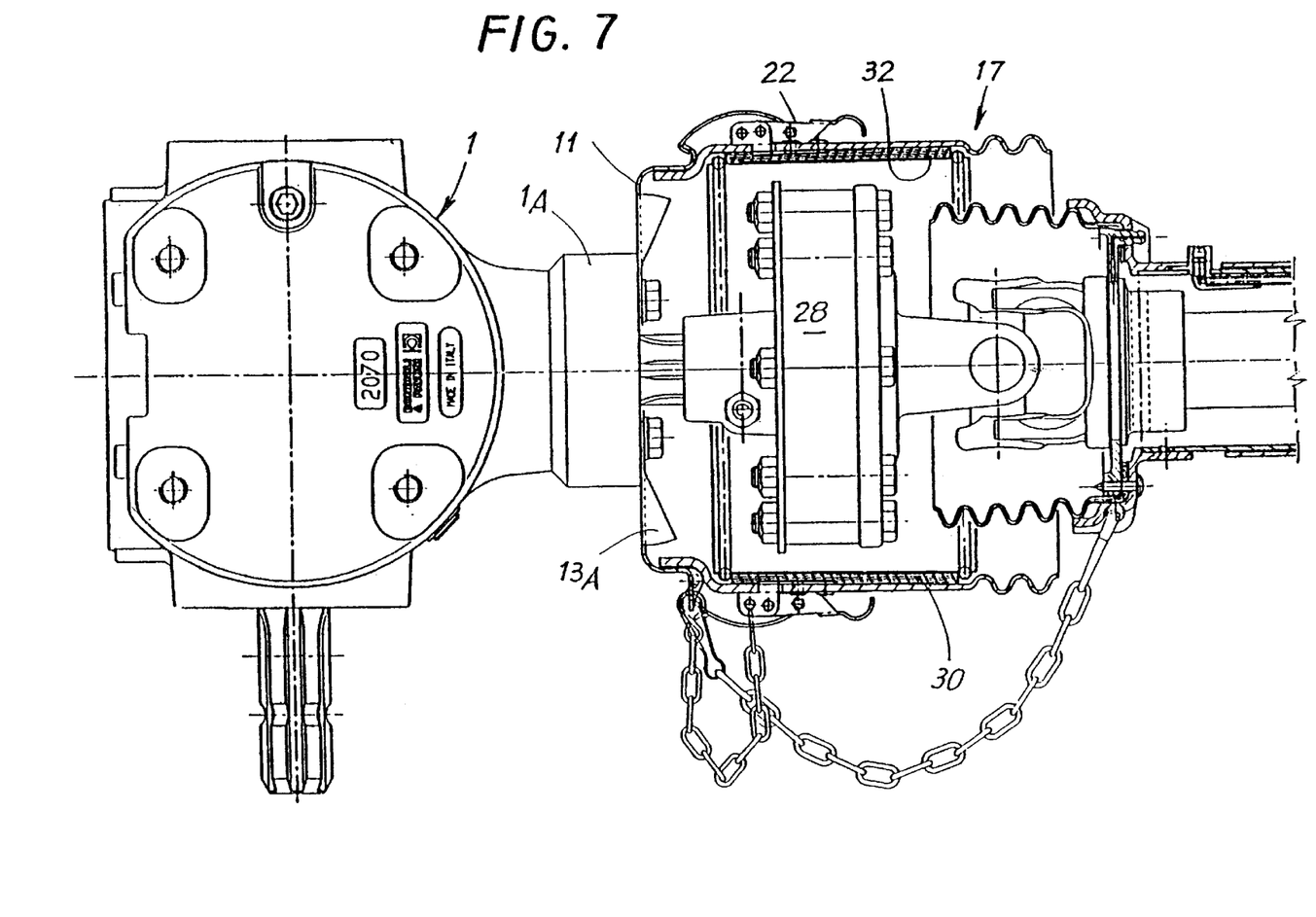
Figure 8:
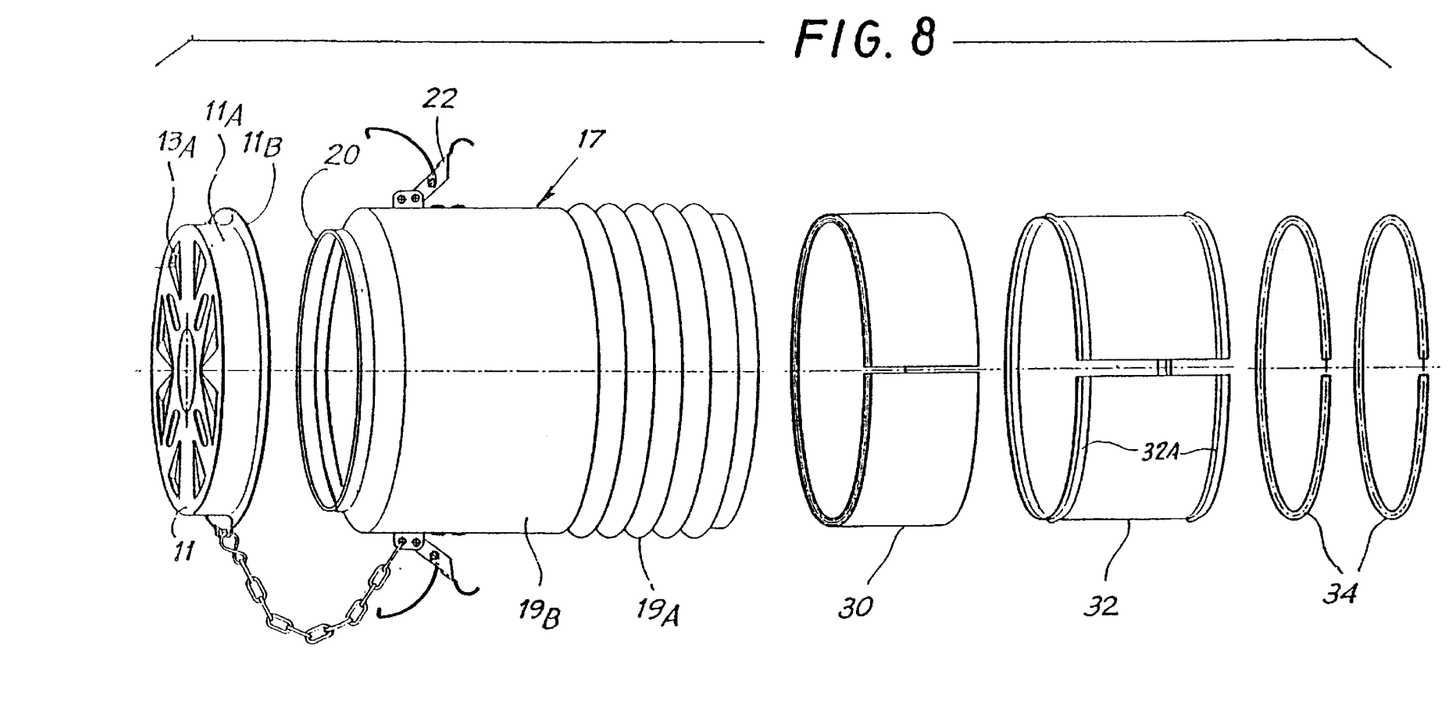
FIG. 8 is a perspective view of the components of a reinforced sleeve.
Figures 9, 10, 11:
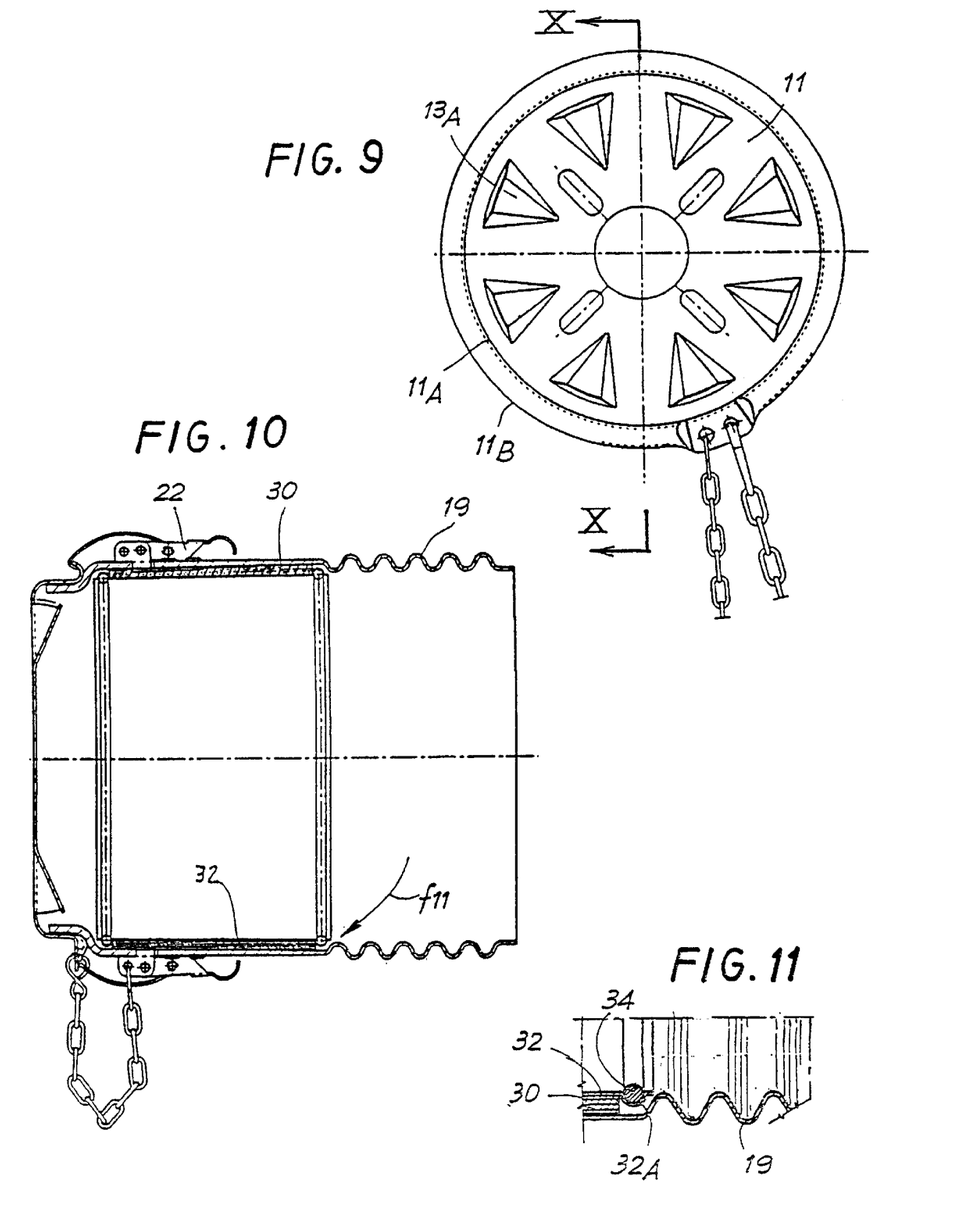
FIGS. 9 and 10 and 11 show the second boot as mounted, in a partial axial view, in the section on X—X as marked in FIG. 9 and in an enlarged detail of the portion indicated by arrow $f_{11}$ in FIG. 10.

The second boot constructed as described may be sufficient to protect the members of the driveline to which it is fitted. In certain cases, however, the second boot requires reinforcing and must also be made protective from the standpoint of thermal insulation, when a member such as a friction clutch or a torque-limiting coupling or the like is present as indicated at 28 in FIGS. 6 and 7. In these cases it is useful to have a reinforced second boot to offer greater strength than the skirt 19. In this case (FIGS. 6 to 10) the sleeve 17 is given insulating layers and reinforcing layers. In particular, the sleeve 17 may be given a layer 30 of thermal insulation for protection against heating of the member present in the driveline, such as the clutch 28 or other equivalent member. A layer of sheet metal 32 is used to hold the layer 30 in place, both these layers being in the form of open rings and the sheet metal piece 32 being applied on the inside of the layer 30, which in turn is applied to the inside of the smooth part 19B of the sleeve 17, which smooth part adjoins both the corrugated part 19A and the edge 20. In order to keep the two layers 30 and 32 in the correct position as shown in FIG. 10 and in FIGS. 6 and 7 and in the detail shown in FIG. 11, the sheet metal piece 32 comprises two grooves 32A around its annular edges to house two locking rings 34 which are elastically expandable and so hold the assembled layers 30 and 32 between the corrugated part 19A and the shaped edge 20 designed to be coupled to the disc 11. The layers 30 and 32 give greater strength and greater protection not only to mechanical stresses but also to the effects of heat transmission.

It will be clear that once the second boot has been mounted, it will be a simple matter to release the clips 22 to withdraw the sleeve 17 of the second boot from the disc 11 in order to gain access to the components normally contained inside and protected by the second boot when the latter is attached to the disc 11. Releasing and reattaching the sleeve 17 in done with great ease by operating the clips 22.

It will be understood that the drawing shows only an illustrative embodiment purely by way of a practical demonstration of the invention, it being possible for the invention to be varied as regards shapes and arrangements without thereby departing from the scope of the concept on which it is based. Any reference numerals which may appear in the accompanying claims are for the purpose of facilitating the reading of the claims with reference to the description and drawing, and do not limit the scope of protection represented by the claims.

What is claimed is:

1. A fixed box boot for protecting parts adjacent to a fixed box from which there projects a rotating hub that it to be connected to a driveline incorporating a jointed shaft with its protective covering, said boot being characterized in that it comprises: attached to the fixed box a disc with a peripheral edge for engagement and fastening; and a sleeve that can be engaged inside the edge of said disc with fastening clips capable of being clipped to and unclipped from said edge, said disc including ventilation apertures, with deformations that function in conjunction with the passage defined between the sleeve and the protective boot that surrounds the universal joint of the driveline, these deformations tending to limit any deforming of said skirt.

2. The boot according to claim 1, characterized in that said sleeve comprises a tubular skirt having flexible portions and made of a synthetic material.

3. The boot according to claim 2, wherein it comprises, on the inside of said tubular skirt, a tubular layer with insulating properties, and a tubular sheet metal piece for reinforcement on the inside.

4. The boot according to claim 3, characterized in that said tubular layer and said tubular sheet metal piece are both bent strips held in place by locking rings housed in channels formed in the sheet metal piece.

5. The boot according to claim 1, wherein it comprises a connecting chain between said disc and said sleeve and a chain, with a clip, between said disc and the protective sheath of the jointed drive shaft.

6. The boot according claim 1, wherein it includes a friction clutch or a torque limiting means or other member.

7. The boot according to claim 1, wherein, said sleeve includes protective layers around the parts which it encloses.

8. A driveline arrangement comprising:

a fixed housing;

a joined shaft extending from said fixed housing;

a shaft boot arranged around said jointed shaft;

a disc attached to the fixed housing, said disc including a peripheral edge;

a sleeve having a first end engageable with said peripheral edge, said sleeve having a second end defining a passage with said shaft boot, said disc including ventilation apertures with deformations that function in conjunction with said passage, said deformations limiting deformation of said second end of said sleeve;

fastening clips for clipping and unclipping said first end of said sleeve to and from said peripheral edge of said disc.

9. The arrangement in accordance with claim 8, wherein:

said second end of said sleeve surrounds said shaft boot.

10. A driveline boot comprising:

a disc attachable to a fixed housing, said disc including a peripheral edge;

a sleeve having a first end engageable with said peripheral edge, said sleeve having a second end;

an insulating tubular layer arranged on an inside of said second end of said sleeve;

a tubular sheet metal piece also arranged inside said second end of said sleeve for reinforcing said sleeve;

fastening clips for clipping and unclipping said first end of said sleeve to and from said peripheral edge of said disc.

* * * * *